United States Patent
Gu et al.

(10) Patent No.: US 10,171,622 B2
(45) Date of Patent: Jan. 1, 2019

(54) DYNAMIC CONTENT REORDERING FOR DELIVERY TO MOBILE DEVICES

(71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/162,312

(22) Filed: May 23, 2016

(65) Prior Publication Data
US 2017/0339246 A1 Nov. 23, 2017

(51) Int. Cl.
| | |
|---|---|
| *H04L 29/08* | (2006.01) |
| *H04L 29/06* | (2006.01) |
| *H04W 4/06* | (2009.01) |
| *H04W 4/18* | (2009.01) |

(52) U.S. Cl.
CPC .......... *H04L 67/32* (2013.01); *H04L 65/1063* (2013.01); *H04L 67/26* (2013.01); *H04W 4/06* (2013.01); *H04W 4/18* (2013.01)

(58) Field of Classification Search
CPC ......... A63F 13/428; G06T 7/11; G06T 7/215; G06T 7/20; H04L 63/10; H04L 67/32; H04L 63/1416; H04L 63/123; H04L 67/04; H04L 67/06; H04L 67/12; H04L 29/08; H04W 4/02; H04W 4/029; H04W 4/021; H04W 4/00; H04W 4/025; G06F 17/30241; G06F 17/30867
See application file for complete search history.

(56) References Cited

U.S. PATENT DOCUMENTS 6,941,148 B2 * 9/2005 Hansmann ............. H04L 29/06
455/466
7,640,491 B2 12/2009 Goodacre et al.
8,447,603 B2 5/2013 Hoory et al.
(Continued)

FOREIGN PATENT DOCUMENTS

| EP | 2460136 A2 | 6/2012 |
|---|---|---|
| WO | 2008024852 A2 | 2/2008 |
| WO | 2010027925 A1 | 3/2010 |

OTHER PUBLICATIONS

Butkiewicz et al., "Klotski: Reprioritizing Web Content to Improve User Experience on Mobile Devices", 12th USENIX Symposium on Networked Systems Design and Implementation (NSDI'15), Oakland, CA, May 2015.
(Continued)

*Primary Examiner* — Sargon N Nano
(74) *Attorney, Agent, or Firm* — Patterson + Sheridan, LLP (57) ABSTRACT

Systems, methods, and computer program products to perform an operation comprising receiving, by a Mobile Backend as a Service (MBaaS) server from an application executing on a mobile device, a request to access content, identifying a set of objects as responsive to the request, determining a respective priority for each object in the set of objects, wherein the priority of each object is based at least in part on a context of the mobile device, and transmitting at least one object in the set of objects according to the determined priorities of each object.

17 Claims, 5 Drawing Sheets

(56) References Cited

U.S. PATENT DOCUMENTS

| | | | |
|---|---|---|---|
| 8,483,668 B2 | 7/2013 | Hurowitz et al. | |
| 8,498,628 B2 | 7/2013 | Shapiro et al. | |
| 8,843,597 B2 | 9/2014 | Leblanc et al. | |
| 8,930,575 B1 | 1/2015 | Bianco et al. | |
| 9,826,045 B2* | 11/2017 | Straub | H04L 67/141 |
| 2003/0093565 A1 | 5/2003 | Berger et al. | |
| 2008/0082316 A1 | 4/2008 | Tsui et al. | |
| 2012/0324353 A1* | 12/2012 | Torbey | G06F 3/048 |
| | | | 715/716 |
| 2013/0179170 A1 | 7/2013 | Cath et al. | |
| 2015/0094014 A1* | 4/2015 | Diamond | H04W 4/90 |
| | | | 455/404.2 |
| 2016/0262113 A1* | 9/2016 | Diamond | H04W 4/90 |
| 2017/0214701 A1* | 7/2017 | Hasan | H04L 63/1408 |
| 2018/0077003 A1* | 3/2018 | Potkonjak | H04L 67/306 |
| 2018/0102985 A1* | 4/2018 | Byers | H04L 47/823 |

OTHER PUBLICATIONS

Higgins et al., "Informed Mobile Prefetching", MobiSys '12, Proceedings of the 10th international conference on Mobile systems, applications, and services pp. 155-168. 2012.

* cited by examiner

DYNAMIC CONTENT REORDERING FOR DELIVERY TO MOBILE DEVICES

BACKGROUND

The present invention relates to cloud computing, and more specifically, to dynamic content reordering for delivery to mobile devices.

Mobile Backend as a Service (MBaaS) is a bridge between the front-end of an application executing on a mobile device and the various cloud-based back-ends. Generally, MBaaS provides these services via a set of unified application programming interfaces (APIs) and software development kits (SDKs), providing a consistent way to manage back-end data. Example cloud-based back-ends include data storage services, messaging services, social media services, and the like. A mobile application may therefore leverage MBaaS to, for example, load search results, store or retrieve images, and publish content to social media.

An MBaaS server may use a version of the Hypertext Transfer Protocol (HTTP) to send requested content to a mobile device. For example, the HTTP/2 protocol enables these servers to push data in multiple streams with multiplexing. Typically, to fulfill a request, the MBaaS server sends multiple files (or objects) to the mobile device. However, the order in which these objects are sent to the mobile device is not optimized, which may degrade the overall user experience on the mobile device.

SUMMARY

Embodiments disclosed herein include systems, methods, and computer program products which perform an operation comprising receiving, by a Mobile Backend as a Service (MBaaS) server from an application executing on a mobile device, a request to access content, identifying a set of objects as responsive to the request, determining a respective priority for each object in the set of objects, wherein the priority of each object is based at least in part on a context of the mobile device, and transmitting at least one object in the set of objects according to the determined priorities of each object.

DETAILED DESCRIPTION

Embodiments disclosed herein provide techniques to provide dynamic content reordering capabilities to improve the experience of mobile device users. For example, a user may use a mobile application to search for hamburger restaurants near their current location. The mobile application may then send a corresponding search request to the MBaaS server. The MBaaS server may then identify a set of search results from a database in the cloud. The MBaaS server may then dynamically assign priorities to each search result in the set of search results based at least in part on a context of the mobile device. The context of the mobile device may include the applications currently executing on the mobile device, the resource use of the mobile device, the nature of the request issued by the mobile device, and the like. The MBaaS server may then leverage the HTTP/2 protocol to transmit the prioritized search results to the mobile device. For example, the first search result sent by the MBaaS server may correspond to a restaurant that specializes in hamburgers, is near the user, and is highly rated by other users (and therefore has a high priority). The MBaaS server may then continue to transmit search results according to the priorities of each search result, controlling the order of data arrival at the mobile device, and enhancing the user's experience.

Figure 1:
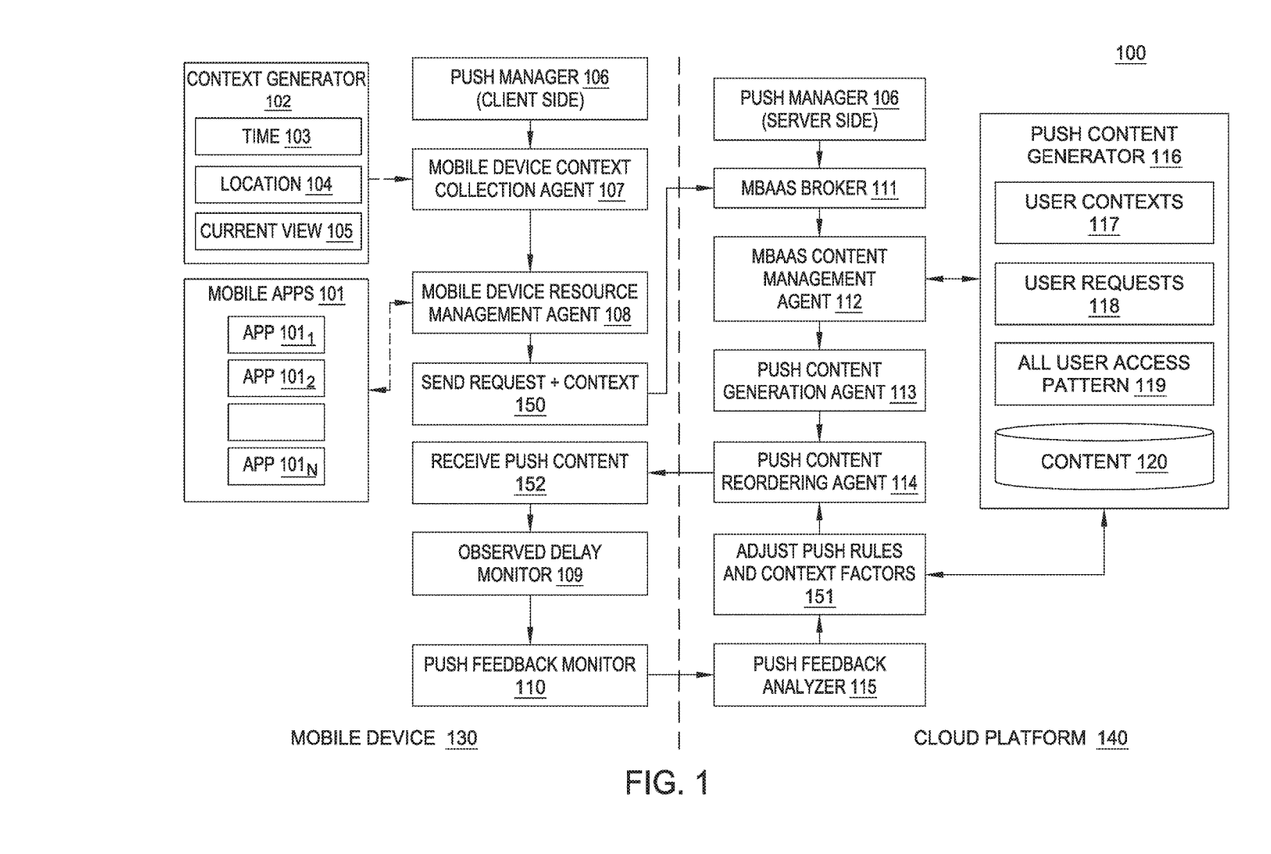
FIG. 1 depicts a computing environment configured to dynamically reorder content for delivery to mobile devices, according to one embodiment.

FIG. 1 depicts a computing environment 100 configured to dynamically reorder content for delivery to mobile devices, according to one embodiment. As shown, the computing environment 100 includes components of a mobile device 130 and components of a cloud computing platform 140. The components of the mobile device 130 may communicate with the components of the cloud computing platform 140 via a network (not pictured).

The mobile device 130 is representative of any type of mobile computing device, such as a smartphone, tablet computer, portable gaming device, and the like. As shown, the mobile device 130 executes a plurality of mobile applications $101_{1-N}$. Generally, the mobile applications 101 may be any type of application. Examples of mobile applications 101 include web browsers, social media applications, image sharing applications, and the like. Generally, the mobile applications 101 may require interactions with content 120 in the cloud platform 140. For example, a user may store hundreds or thousands of images in the content 120, all of which cannot be stored or displayed on the mobile device 130 due to resource constraints on the mobile device 130. However, the user may request to view the images in the content 120. Because all of the images cannot be stored on the mobile device 130, the cloud platform 140 must send a subset of the images to the mobile device 130. Advantageously, embodiments disclosed herein prioritize the content (e.g., the images in the content 120) sent to the mobile device based at least in part on the context of the mobile device.

Responsive to the user's request to perform an operation (such as viewing the images stored in the content 120), the application 101 may invoke the push manager 106 to facilitate communications with the cloud platform 140. Generally, the push manager 106 is distributed logic configured to facilitate requests on behalf of the applications 101 that touch the back-end services provided by the cloud platform 140 (e.g., a request to view images stored in the content 120). Furthermore, the push manager 106 is configured to serve content to the user based on a determined priority of the content, where the priority is based at least in part on the context of the mobile device, as described in greater detail below.

As shown, the mobile device 130 includes a context generator 102 configured to generate a current context of the mobile device. In at least one embodiment, the context generator 102 executes as a background daemon process on the mobile device 130 that continuously computes an updated context for the mobile device 130. Generally, the context generator 102 may consider any attribute of the mobile device 130 when determining the current context of the mobile device. For example, the context generator 102 may pull data from different sensors (e.g., accelerometer, camera, microphone, and the like) on the device, information currently being outputted for display on a display of the mobile device, resource usage (e.g., processor, memory, storage, and network use), and the applications 101 which are currently executing on the mobile device. In at least one embodiment, the mobile device resource management agent 108 provides the resource utilization information to the context generator 102. As shown, the context generator 102 may further consider a current time 101, location 104 of the mobile device, and a current view 105 (e.g., what is displayed on the screen of the mobile device) when determining the current context of the mobile device. The context generator 102 may then compress the collected context information and send the compressed context information to a mobile device context collection agent 107.

The mobile device context collection agent 107 may, responsive to receiving an indication from the push manager 106, provide the current context of the mobile device 130 to the mobile device resource management agent 108. Similarly, responsive to an indication from the push manager 106, the mobile device resource management agent 108 may be invoked. The mobile device resource management agent 108 is an enhanced resource management module which determines the current resources required by the applications 101 executing on the mobile device. The mobile device resource management agent 108 is therefore able to determine actual resource requirements, as well as predict future resource requirements, of the applications 101. For example, the mobile device resource management agent 108 may determine that the applications 101 are using 50% of the CPU of the mobile device, and predict that the applications 101 will continue to use 50% of the CPU for the next 5 minutes. When invoked, the mobile device resource management agent 108 may generate a request, and send the request and current context (received from the context collection agent 107) to the MBaaS broker at block 150.

As shown, the MBaaS broker 111 is a component of the cloud platform 140. The MBaaS broker 111 is a client-facing server that communicates with mobile clients, such as the mobile device 130, directly. The MBaaS broker 111 may receive the context and the request to access back-end services and/or content from the mobile device 130. Responsive to receiving the information from the mobile device 130, he MBaaS broker 111 may invoke an MBaaS content management agent 112. As shown, the MBaaS content management agent 112 is generally configured to interface with the push content generator 116. The MBaaS content management agent 112 may provide the received user context and the request to the push content generator 116, and receive a set of items of content from the push content generator 116.

The push content generator 116 is an enhanced data mining module that predicts the content that will be requested by the mobile device 130 in the future (e.g., in subsequent requests, such as a request to view a second page of search results or images). As shown, the push content generator 116 includes user contexts 117, user requests 118, user access patterns 119, and a content 120. The user contexts 117 stores the contexts of all mobile devices making requests for content 120. The user requests 118 stores indications of each request received from all mobile devices 130. The user access patterns 119 stores historical user access patterns to the content 120. The content 120 is representative of content stored in the cloud platform 140, and may be any type of content, such as images, videos, files, objects, metadata, and the like. Generally, the push content generator 116 uses the user contexts 117, user requests 118, and user access patterns 119 to predict, for a given request, the content 120 that the mobile device 130 will subsequently request. Continuing with the image browsing example, the current request may request to view a first subset of images in the content 120. The push content generator 116 may identify the first subset of images in the content 120, and provide an indication of the requested content to the MBaaS content management agent 112. Furthermore, the push content generator 116 may analyze the request to view the first subset of images, the user context, and the user access patterns 119 to determine a second subset of images in the content 120 that the mobile device 130 may subsequently request. For example, if the first subset of images correspond to a date on which the user was on vacation, the push content generator 116 may identify the date in the request, and identify images captured at the vacation destination on nearby dates. Similarly, if the user requests 118 indicate that this user has previously requested the first subset of images, the user requests 118 and user access patterns 119 may indicate which images in the content 120 the user previously requested. The push content generator 116 may then leverage this information when predicting which images the user will request subsequent to the current request. Further still, the push content generator 116 may consider the current context of the mobile device 130. If the context indicates that the mobile device 130 has a speedy network connection and ample memory and storage, the push content generator 116 may predict future requested content accordingly. For example, the push content generator 116 may identify high resolution images and/or a larger count of images that the user may subsequently request. As another example, if the context indicates that the mobile device 130 has a slow network connection and has exhausted most (or all) of its memory and storage space, the push content generator may identify lower resolution images and/or a fewer number of images that the user may subsequently request.

After identifying a current set of items of content 120 that are responsive to the request and a predicted set of content 120 that the user may request in the future, the push content generator 116 may transmit an indication of the identified content 120 to the MBaaS content management agent 112. The MBaaS content management agent 112 may then invoke the push content generation agent 113, which provides an indication of the identified content to the push content reordering agent 114. The push content reordering agent 114 is an enhanced machine learning module which adaptively changes the ordering of content 120 pushed to the mobile device 130 based on the predicted use sequences of the mobile device 130. The push content reordering agent 114 may apply a set of rules and at least one scoring algorithm to the current mobile context to score each piece of identified content 120.

For example, the push content reordering agent 114 may consider a first image from the content 120 having a high resolution that has been accessed multiple times by the user. The push content reordering agent 114 may consider the context, which indicates that at least a portion of the display of the mobile device 130 is configured to display the high resolution image via a placeholder. The context may further indicate that the resources of the mobile device 130 are relatively free, indicating that the mobile device 130 can receive, store, and display the high resolution image. Based on each of these factors, the push content reordering agent 114 may therefore compute a relatively high score for the high resolution image. As another example, the push content reordering agent 114 may consider a second image from the content 120. The user access pattern 119 may indicate that the user has not previously viewed the second image. The context of the mobile device may indicate that a placeholder for the second image is not currently displayed on the screen of the mobile device. Based on these factors, the push content reordering agent 114 may compute a score for the second image that is lower than the score of the first image, indicating the first image has a higher relative priority than the second image. The push content reordering agent 114 may then use the computed scores to re-order the identified content 120, which is then sent to the mobile device 130 at block 152. Continuing with this example, therefore, the push content reordering agent 114 may push the first image to the mobile device 130 before pushing the second image to the mobile device 130. Generally, the push content reordering agent 114 pushes content to the mobile device 130 based on the computed score (or priority) for each item of content. In at least one embodiment, the push content reordering agent 114 pushes the items of content according to the HTTP/2 protocol, which may divide and multiplex each individual item of content.

When the mobile device receives the push content at block 152, an observed delay monitor 109 may be invoked. The observed delay monitor 109 is an enhanced mobile background daemon process that continuously records the access sequences of received content 120 by different applications 101 executing on the mobile device 140. The observed delay monitor 109 may then generate compressed metadata describing the monitored use and/or delay patterns, which may be provided to the push feedback monitor 110. Examples of collected metadata include times the content as accessed (and by which application $101_{1-N}$), how long the content was displayed on the mobile device 130, the order in which the content was viewed, whether the content was saved on the mobile device 130, network latency, and the like. The push feedback monitor 110 is an enhanced mobile background daemon that continuously monitors the frequencies and access patterns of content 120 by the applications 101 on the mobile device 130. The push feedback monitor 110 may generate compressed metadata describing the patterns and access frequencies, and may provide the metadata to the push feedback analyzer 115 of the cloud platform 140.

The push feedback analyzer 115 is an enhanced machine learning module that learns and analyzes the metadata describing the actual use sequences of content 120 on mobile devices 120, and dynamically adapts the rules of content generation and ordering applied by the push content generator 116. Therefore, based on the metadata received from the push feedback monitor 110, the push feedback analyzer 115 may adjust the push rules and context factors at block 151. As shown, these rules and context factors are used by the push content reordering agent 114 when scoring content, and by the push content generator 116 when identifying content 120 to serve to the mobile client.

The dynamic reordering of content in mobile device/cloud interactions is used herein as a reference example of dynamic content reordering, and should not be considered limiting of the disclosure. Indeed, the disclosure may apply equally to other contexts, such as providing dynamic content reordering for interactions between web applications and online gaming environments (e.g., where graphics and/or scenes are dynamically reordered). Generally, the disclosure may apply equally to any context where content can be dynamically prioritized and reordered, facilitating delivery of prioritized content to any number of applications, services, and devices.

Figure 2:
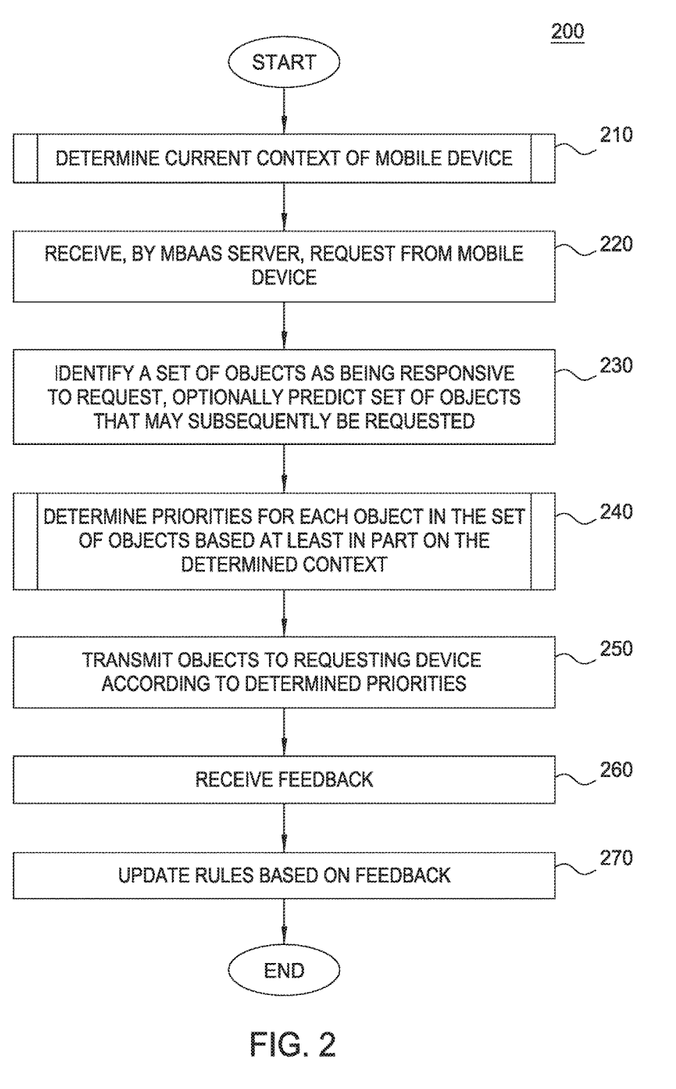
FIG. 2 is a flow chart illustrating a method to dynamically reorder content for delivery to mobile devices, according to one embodiment.

FIG. 2 is a flow chart illustrating a method 200 to dynamically reorder content for delivery to mobile devices, according to one embodiment. As shown, the method 200 begins at block 210, described in greater detail with reference to FIG. 3, where a current context of a mobile device is determined. As previously indicated, the context generator 102 may consider a plurality of attributes of the mobile device to determine the context. For example, the context generator 102 may consider the applications 101 executing on the mobile device, the resource use rates of the mobile device, which applications are currently being viewed by the user, and the like. At block 220, the MBaaS server may receive a request for content from a mobile device. For example, a restaurant rating application 101 executing on the mobile device 130 may request search results for pizza restaurants in a given city. The request may include data describing the current context of the mobile device. In at least one embodiment, the MBaaS broker 111 receives the request and the context from the mobile device.

At block 230, the push content generator 116 may identify a set of objects in the content 120 as being responsive to the request, and optionally predict a set of objects in the content 120 that may be subsequently requested by the same mobile device. For example, the push content generator 116 may identify a first set of search results that includes the top rated pizza restaurants in the city. The first set of search results may, when outputted on the mobile device, correspond to a single page of search results. However, the push content generator 116 may predict a second (or third, or fourth, etc.) page of search results that the mobile device may request. As previously indicated, the push content generator 116 predicts the additional content based on the mobile device context 117, user requests 118, and user access patterns 119. For example, if the mobile device is in a first location (where the location is part of the device's context) the push content generator 116 may identify and/or predict search results for pizzerias that are within a predefined distance of the mobile device. Similarly, if the access pattern 119 of this user (and/or all users) indicate that the user views pasta restaurants when searching for pizza restaurants, the push content generator 116 predictively identify search results corresponding to pasta restaurants.

At block 240, described in greater detail with reference to FIG. 4, the push content reordering agent 114 may determine priorities for all objects identified at block 230. Generally, the push content reordering agent 114 determines the priorities for the objects by computing a score for each object, where the score is based at least in part on a set of rules and the current context of the mobile device. In at least one embodiment, the score may be based on feedback and/or actions of other users, users having a similar profile to the current user, users in similar locations, similar contexts, and the like. At block 250, the push content reordering agent 114 may transmit the objects to the requesting device according to the priorities determined at block 240. Generally, objects having a higher computed score have a higher relative priority than objects having a lower computed score. Therefore, the push content reordering agent 114 may transmit the highest scored object, followed by the next-highest scored object, and so on. At block 260, the push feedback analyzer 115 may receive feedback from the observed delay monitor 109 and the push feedback monitor 110. At block 270, the push feedback analyzer 115 may update the rules based on the received feedback. For example, a first rule may prioritize resource use levels on the device (e.g., more available resources may result in a higher score for objects requiring greater computing resources). However, over time, the received feedback may indicate that the availability of the resources is not a constraint for a certain class of objects (such as text-based search results, which are not resource intensive). Therefore, the push feedback analyzer 115 may modify the first rule to remove the emphasis on resource use levels for this class of objects.

Figure 3:
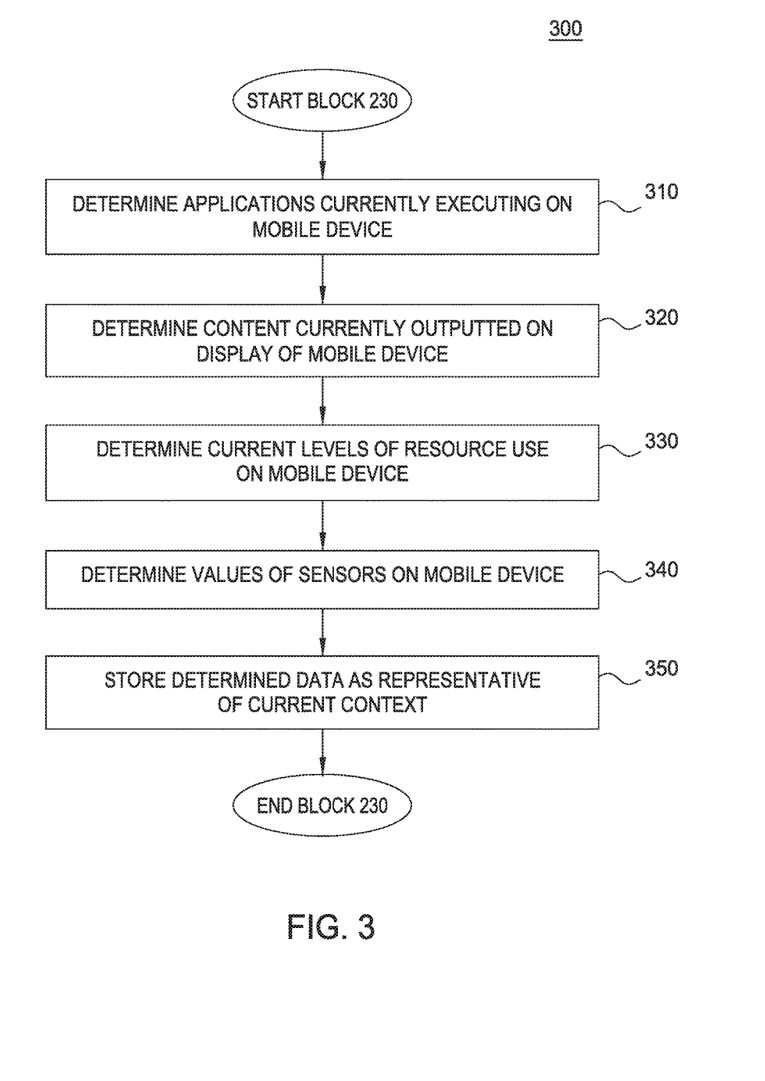
FIG. 3 is a flow chart illustrating a method to determine a current context of a mobile device, according to one embodiment.

FIG. 3 is a flow chart illustrating a method 300 corresponding to block 210 to determine a current context of a mobile device, according to one embodiment. In at least one embodiment, the context generator 102 performs the method 300. However, the mobile device may send the necessary data to a remote entity, such as the MBaaS broker 111, which may compute the context of the mobile device. As shown, the method 300 begins at block 310, where the context generator 102 determines which applications are currently executing on the mobile device. The context generator 102 may reference a data store which includes metadata describing each application, thereby providing additional details regarding each application, such as type, average resource use levels, and the like. At block 320, the context generator 102 determines what content is currently being outputted on the display of the mobile device. Doing so allows the context generator 102 to identify which application(s) the user is currently interacting with, and further defines the context of the device. At block 330, the context generator 102 and/or the mobile device resource management agent 108 may determine the current levels of resource use on the mobile device. For example, the resource use may reflect the CPU use level, amount of free memory or storage space, and current network utilization rates. At block 340, the context generator 102 may determine values of sensors on the mobile device, such as accelerometers, microphones, and cameras. The values of these sensors may provide additional insight as to the current context of the mobile device. For example, image data from the camera may indicate the user is in attendance at a baseball game, while the audio data from the microphone may capture a conversation discussing the current pitcher of the baseball game. At block 350, the context generator 102 may store the data determined at blocks 310-340 as representative of the current context of the mobile device.

Figure 4:
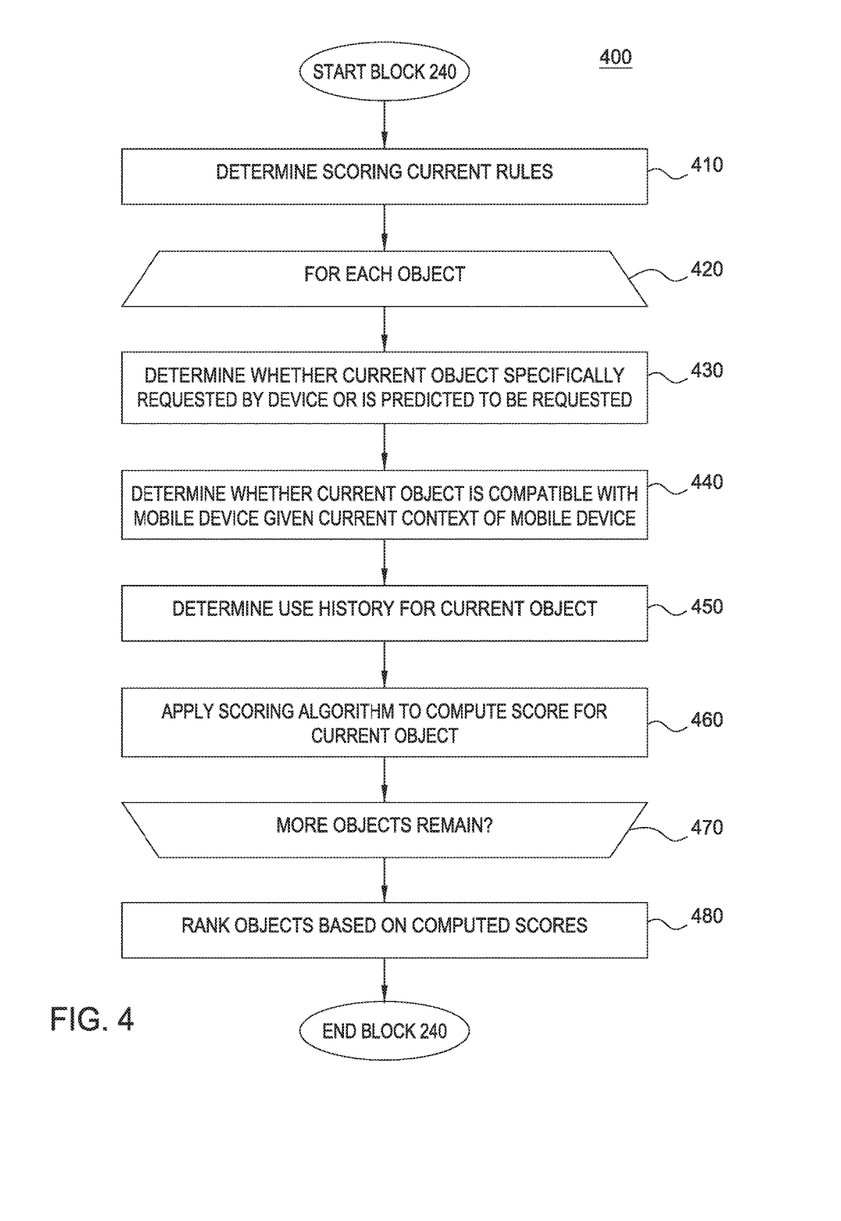
FIG. 4 is a flow chart illustrating a method to determine priorities for content objects, according to one embodiment.

FIG. 4 is a flow chart illustrating a method 400 corresponding to block 240 to determine priorities for content objects, according to one embodiment. In at least one embodiment, the push content reordering agent 114 performs the method 400. The method 400 begins at block 410, where the push content reordering agent 114 determines the current rules for scoring data objects. The rules may consider attributes of the mobile device, the requested content, the requesting mobile application, the current context of the device, and the like. At block 420, the push content reordering agent 114 executes a loop including blocks 430-460 for each object (or item of content) identified at block 240. At block 430, the push content reordering agent 114 determines whether the current object is specifically requested by the mobile device, or was predicted by the push content generator 116 as likely to be requested in the future by the mobile device. Generally, content that is specifically requested may receive a higher score than predicted content. At block 440, the push content reordering agent 114 may determine whether the current object is compatible with the mobile device given the current context of the mobile device. For example, if an image is eight gigabytes in size and the mobile device only has one gigabyte of RAM or storage, the image is not likely to be rendered appropriately on the device. Therefore, the image may receive a lower score.

At block 450, the push content reordering agent 114 may determine the use history for the current object from the user requests 118 and the user access patterns 119, via the push content generator 116. Generally, content that is frequently accessed (by the requesting user and/or across all users) may receive a higher score relative to content that is not frequently accessed. The use history may further reflect use history and/or patterns by other users and/or devices. At block 460, the push content reordering agent 114 may apply a scoring algorithm to compute a score for the current object. The scoring algorithm may be any suitable algorithm which produces a score on a range of scores (e.g., 0-100). The range of scores may be associated with a priority class, e.g., 0-10 in a lowest priority class, and 90-100 in a highest priority class. At block 470, the push content reordering agent 114 may determine whether more objects remain. If more objects remain, the push content reordering agent 114 returns to block 420 to score the remaining objects. If no objects remain, the push content reordering agent 114 proceeds to block 480, where the push content reordering agent 114 ranks (or reorders) the objects based on their computed scores.

Figure 5:
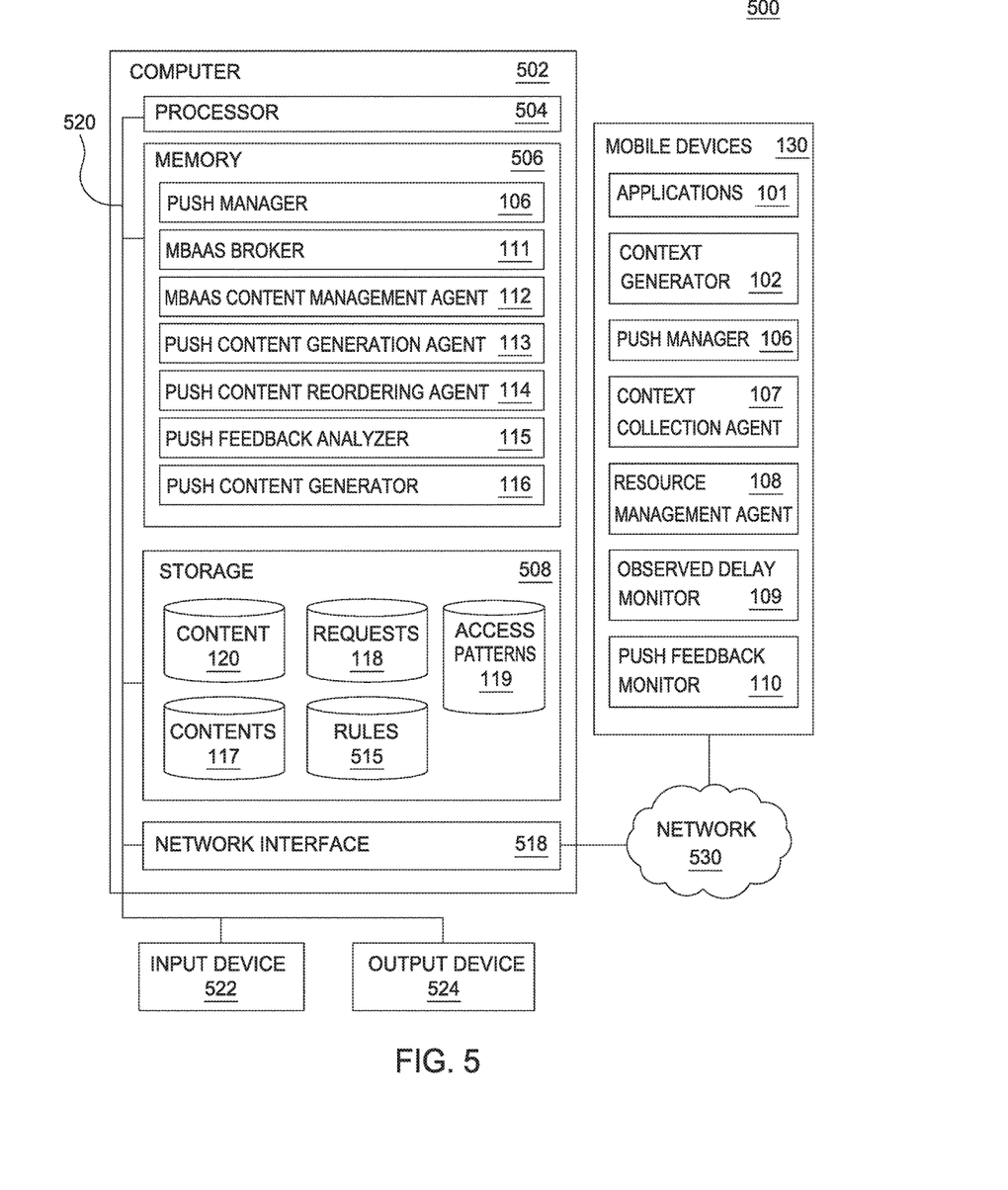
FIG. 5 is a block diagram illustrating a system configured to dynamically reorder content for delivery to mobile devices, according to one embodiment.

FIG. 5 is a block diagram illustrating a system 500 configured to dynamically reorder content for delivery to mobile devices, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the push manager 106, MBaaS broker 111, MBaaS content management agent 112, push content generation agent 113, push content reordering agent 114, push feedback analyzer 115, and push content generator 116, all described in greater detail above. As shown, the storage 508 contains the contexts 117, requests 118, access patterns 119, and content 120, all described in greater detail above. The storage 508 further contains the rules 515, which are a set of rules used by the push content reordering agent 114 to score items of content in the content 120. Generally, the computer 502 is configured to implement all systems, methods, and apparatuses described with reference to FIGS. 1-4.

As shown, the system 500 includes one or more mobile devices 130, described in greater detail above. The mobile devices 130 include a processor, memory, network interface, and storage (all not pictured). As shown, the mobile device 130 executes one or more applications 101, the mobile device context generator 102, the push manager 106, the mobile device context collection agent 107, the mobile device resource management agent 108, the observed delay monitor 109, and the push feedback monitor 110.

Advantageously, embodiments disclosed herein provide techniques to dynamically reorder content requested by a mobile device that resides in a cloud computing platform. The MBaaS platform described herein may reorder content based on the priorities of each item of content, where the priority is based on a score computed for the content. The score may be computed based at least in part on a current context of the mobile device. Doing so allows for the manipulation of arrival times of content at a mobile device, thereby improving the overall user experience.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the push content reordering agent 114 could execute on a computing system in the cloud and prioritize content based on a context of a mobile device requesting the content. In such a case, the push content reordering agent 114 could compute a score for each of a plurality of items of content and store the scores at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, by a Mobile Backend as a Service (MBaaS) server from an application executing on a mobile device, a request to access content;
   identifying a set of objects as responsive to the request;
   determining a respective priority for each object in the set of objects, wherein the priority of each object is based at least in part on a context of the mobile device; and
   transmitting at least one object in the set of objects according to the determined priorities of each object, wherein determining the priority of each object comprises computing a score for each object, wherein the score is computed based on: (i) the context of the mobile device, (ii) at least one attribute of the object, (iii) at least one rule for scoring objects, (iv) a use history for the object, (v) a compatibility of the object with the mobile device, (vi) a use history of the mobile device, and (vii) a use history of a plurality of other mobile devices.

2. The method of claim 1, further comprising determining the context of the mobile device by:
   identifying at least one application currently displayed on a display of the mobile device;
   identifying a set of applications executing on the mobile device;

determining, for each of a plurality of resources of the mobile device, a respective use level, wherein the use level comprises an actual use and a predicted future use; and
receiving sensor data from each of a plurality of sensors on the mobile device.

3. The method of claim 1, wherein a first score is computed for a first object in the set of objects, wherein a second score is computed for a second object in the set of objects, wherein the first score is greater than the second score, wherein the priority of the first object is greater than the priority of the second object, wherein the first object is transmitted to the mobile device prior to the second object being transmitted to the mobile device.

4. The method of claim 1, further comprising:
receiving feedback describing: (i) a use, and (ii) a delay in receiving the at least one content on the mobile device; and
modifying the at least one rule based on the received feedback.

5. The method of claim 1, wherein the request is a first request, the method further comprising:
identifying a second set of objects, wherein each object in the second set of objects is predicted to be requested as part of a second request received from the mobile device, wherein each object in the second set of objects is identified based on: (i) the context of the mobile device, (ii) a history of requests for objects by the requesting user, (iii) a history of requests for objects by all users, and (iv) a pattern of accessing the objects.

6. The method of claim 1, wherein the at least one object is transmitted to the mobile device using a push mechanism, wherein the set of objects are of a plurality of objects stored in a cloud computing environment, wherein the MBaaS server acts as an intermediary between the application executing on the mobile device and the cloud computing environment.

7. A mobile backend as a service (MBaaS) server, comprising:
a computer processor; and
a memory containing a program, which when executed by the processor, performs an operation comprising:
receiving, by the MBaaS server from an application executing on a mobile device, a request to access content;
identifying a set of objects as responsive to the request;
determining a respective priority for each object in the set of objects, wherein the priority of each object is based at least in part on a context of the mobile device; and
transmitting at least one object in the set of objects according to the determined priorities of each object,
wherein determining the priority of each object comprises computing a score for each object, wherein the score is computed based on: (i) the context of the mobile device, (ii) at least one attribute of the object, (iii) at least one rule for scoring objects, (iv) a use history for the object, (v) a compatibility of the object with the mobile device, (vi) a use history of the mobile device, and (vii) a use history of a plurality of other mobile devices.

8. The MBaaS server of claim 7, the operation further comprising determining the context of the mobile device by:
identifying at least one application currently displayed on a display of the mobile device;
identifying a set of applications executing on the mobile device;
determining, for each of a plurality of resources of the mobile device, a respective use level, wherein the use level comprises an actual use and a predicted future use; and
receiving sensor data from each of a plurality of sensors on the mobile device.

9. The MBaaS server of claim 7, wherein a first score is computed for a first object in the set of objects, wherein a second score is computed for a second object in the set of objects, wherein the first score is greater than the second score, wherein the priority of the first object is greater than the priority of the second object, wherein the first object is transmitted to the mobile device prior to the second object being transmitted to the mobile device.

10. The MBaaS server of claim 7, the operation further comprising:
receiving feedback describing: (i) a use, and (ii) a delay in receiving the at least one content on the mobile device; and
modifying the at least one rule based on the received feedback.

11. The MBaaS server of claim 7, wherein the request is a first request, the operation further comprising:
identifying a second set of objects, wherein each object in the second set of objects is predicted to be requested as part of a second request received from the mobile device, wherein each object in the second set of objects is identified based on: (i) the context of the mobile device, (ii) a history of requests for objects by the requesting user, (iii) a history of requests for objects by all users, and (iv) a pattern of accessing the objects.

12. The MBaaS server of claim 7, wherein the at least one object is transmitted to the mobile device using a push mechanism, wherein the set of objects are of a plurality of objects stored in a cloud computing environment, wherein the MBaaS server acts as an intermediary between the application executing on the mobile device and the cloud computing environment.

13. A computer program product, comprising:
a non-transitory computer-readable storage medium having computer-readable program code embodied therewith, the computer-readable program code executable by one or more computer processors to perform an operation comprising:
receiving, by a Mobile Backend as a Service (MBaaS) server from an application executing on a mobile device, a request to access content;
identifying a set of objects as responsive to the request;
determining a respective priority for each object in the set of objects, wherein the priority of each object is based at least in part on a context of the mobile device; and
transmitting at least one object in the set of objects according to the determined priorities of each object,
wherein the score is computed based on: (i) the context of the mobile device, (ii) at least one attribute of the object, (iii) at least one rule for scoring objects, (iv) a use history for the object, (v) a compatibility of the object with the mobile device, (vi) a use history of the mobile device, and (vii) a use history of a plurality of other mobile devices.

14. The computer program product of claim 13, the operation further comprising determining the context of the mobile device by:

identifying at least one application currently displayed on a display of the mobile device;

identifying a set of applications executing on the mobile device;

determining, for each of a plurality of resources of the mobile device, a respective use level, wherein the use level comprises an actual use and a predicted future use; and receiving sensor data from each of a plurality of sensors on the mobile device.

15. The computer program product of claim 13, wherein a first score is computed for a first object in the set of objects, wherein a second score is computed for a second object in the set of objects, wherein the first score is greater than the second score, wherein the priority of the first object is greater than the priority of the second object, wherein the first object is transmitted to the mobile device prior to the second object being transmitted to the mobile device.

16. The computer program product of claim 13, the operation further comprising:

receiving feedback describing: (i) a use, and (ii) a delay in receiving the at least one content on the mobile device; and modifying the at least one rule based on the received feedback.

17. The computer program product of claim 13, wherein the at least one object is transmitted to the mobile device using a push mechanism, wherein the set of objects are of a plurality of objects stored in a cloud computing environment, wherein the MBaaS server acts as an intermediary between the application executing on the mobile device and the cloud computing environment, wherein the request is a first request, the operation further comprising:

identifying a second set of objects, wherein each object in the second set of objects is predicted to be requested as part of a second request received from the mobile device, wherein each object in the second set of objects is identified based on: (i) the context of the mobile device, (ii) a history of requests for objects by the requesting user, (iii) a history of requests for objects by all users, and (iv) a pattern of accessing the objects.

* * * * *